United States Patent
Jung et al.

(10) Patent No.: US 8,171,831 B2
(45) Date of Patent: May 8, 2012

(54) MANUALLY FED MACHINE FOR WORKING ON MATERIALS, OBJECTS AND THE LIKE, AND PROTECTIVE MEANS FOR SUCH A MACHINE

(75) Inventors: Norbert Jung, Langerwehe (DE); Dietmar Reinert, Augustin (DE); Oliver Schwaneberg, Bonn (DE)

(73) Assignees: Hochschule Bonn-Rhein-Sieg, Sankt Augustin (DE); Deutsche Gesetzliche Unfallversicherung e.V., Sankt Augustin (DE)

( * ) Notice: Subject to any disclaimer, the term of this patent is extended or adjusted under 35 U.S.C. 154(b) by 748 days.

(21) Appl. No.: 12/161,575

(22) PCT Filed: Dec. 17, 2007

(86) PCT No.: PCT/EP2007/064084
§ 371 (c)(1),
(2), (4) Date: Dec. 1, 2008

(87) PCT Pub. No.: WO2008/071805
PCT Pub. Date: Jun. 19, 2008

(65) Prior Publication Data
US 2009/0301275 A1 Dec. 10, 2009

(30) Foreign Application Priority Data

Dec. 15, 2006 (DE) .......................... 10 2006 059 793

(51) Int. Cl.
*F16P 3/14* (2006.01)
*B23Q 11/00* (2006.01)
*B26D 7/22* (2006.01)

(52) U.S. Cl. .............................. 83/58; 83/63; 83/DIG. 1
(58) Field of Classification Search ................ 83/58, 61, 83/63, DIG. 1; 356/39–41, 301, 445–446, 356/317–318, 417–418
See application file for complete search history.

(56) References Cited

U.S. PATENT DOCUMENTS

| | | | |
|---|---|---|---|
| 5,908,384 A * | 6/1999 | West | 600/310 |
| 6,546,267 B1 * | 4/2003 | Sugiura et al. | 600/310 |
| 2004/0167502 A1 | 8/2004 | Weckwerth et al. | |
| 2004/0247275 A1 * | 12/2004 | Vakhshoori et al. | 385/129 |
| 2005/0066784 A1 | 3/2005 | Gass | |
| 2006/0101960 A1 * | 5/2006 | Smith et al. | 83/58 |

OTHER PUBLICATIONS

International Search Report and Written Opinion for corresponding International Application No. PCT/EP2007/064084 mailed Mar. 5, 2008.

* cited by examiner

*Primary Examiner* — Stephen Choi
(74) *Attorney, Agent, or Firm* — Renner, Otto, Boisselle & Sklar, LLP

(57) ABSTRACT

A manually fed working machine including a working tool, a feeding area in front of the tool, a detector covering at least a section of the feeding area for a contactless detection of human skin, the detector comprising at least one radiation unit and at least one receiver unit. The at least one radiation unit emitting radiation towards said section of the feeding area, said radiation being emitted with at least two different wavelengths in the wavelength range between 900 nm and 1500 nm, whereas the at least one receiver unit receives the radiation reflected from the section of the feeding area, and a signal evaluation unit connected with the detector calculating the quotients or differences of the intensities of the reflected radiations received by the receiver unit and the at least two different wavelengths emitted from the radiation unit.

10 Claims, 2 Drawing Sheets

Figure 1:
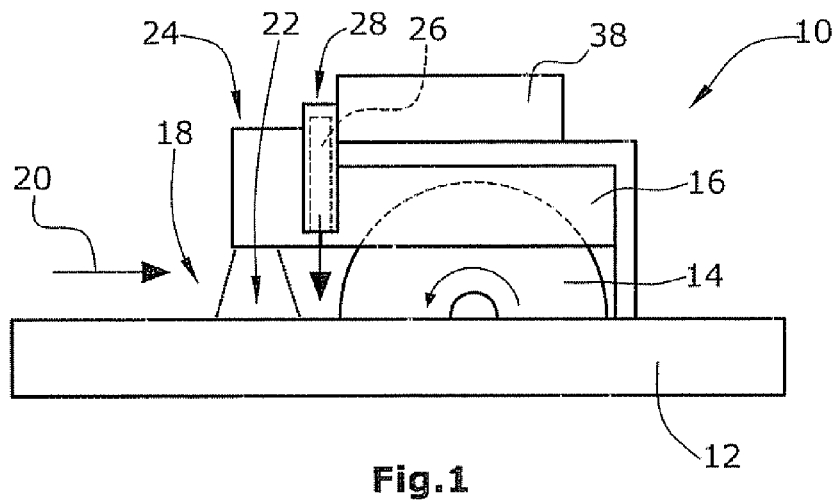

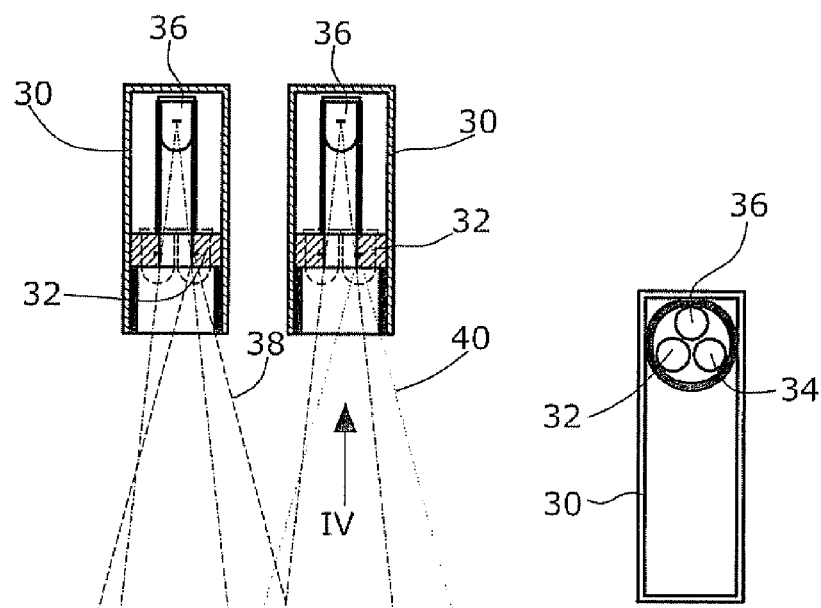
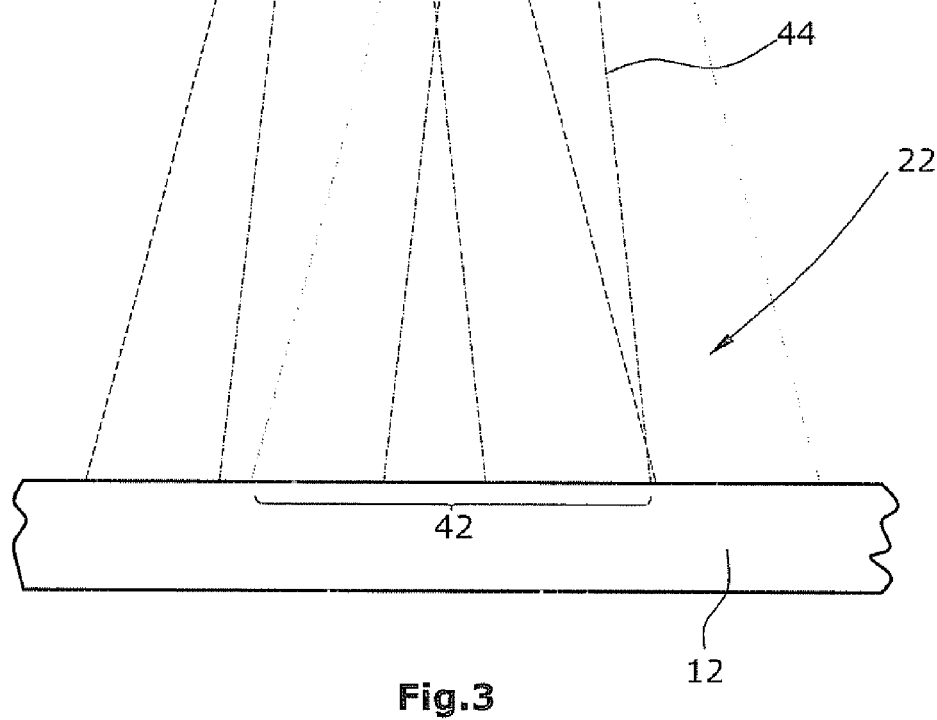
Fig.4
Fig.3

MANUALLY FED MACHINE FOR WORKING ON MATERIALS, OBJECTS AND THE LIKE, AND PROTECTIVE MEANS FOR SUCH A MACHINE

This application is a national phase of International Application No. PCT/EP07/064084 filed Dec. 17, 2007 and published in the English language.

The invention refers to a manually fed machine for working on materials, objects or the like. In particular, the machine refers to circular saw or band saw benches, planing benches, bench drills, presses or scissors The invention further refers to a protective means for a working machine.

With manually fed material working machines, an increased level of protection against injuries is required. Thus, with circular saw benches, for example, it has to be provided that the saw blade is covered and/or stopped as soon as it is detected that a hand approaches the saw blade. Heretofore, no adequate and satisfactory solutions to such problems exist in prior manually fed treating and/or processing or working machines.

It is generally known to use infrared cameras to monitor an area to be protected against intrusion by humans. An example for such a system is described in U.S. Pat. No. 6,370,260. The known system works with cameras receiving in the near-infrared spectrum, the area to be monitored being exposed to broadband radiation The known systems are too expensive to prevail in simple machines such as manually fed treating and/or processing machines.

Thus, it is an object of the invention to provide a manually fed treating and/or processing machine for materials, objects or the like, which has a simplified and especially economic detection capability for detecting human skin and for distinguishing human skin from materials and objects to be treated, or the like.

To achieve this object, the invention proposes a manually fed treating and/or processing machine for materials, objects or the like, which is provided with:
- a working tool,
- a feeding area in front of the tool, within which a person's hand is present when feeding material to be worked on to the tool,
- a detector covering at least a section of the feeding area for a contactless detection of human skin,
- the detector comprising at least one set of at least two transmitter diodes and at least one receiver diode,
- the at least two transmitter diodes emitting narrowband radiation towards said section of the feeding area, said radiation being emitted at at least two different transmission wavelengths in the wavelength range between 400 nm and 1500 nm, wherein at least one of the transmitter diodes emits in the wavelength range between 900 nm and 1500 nm, whereas the at least one receiver diode receives the radiation reflected from the section of the feeding area,
- a signal evaluation unit connected with the detector for evaluating the intensity of the reflected radiation from the transmitter diodes received, in particular sequentially, by the receiver diode,
- the signal evaluation unit determining from the intensities of the reflected radiation from the transmitter diodes, whether the detector detects human skin, and wherein upon the detection of human skin, a protective means may be activated for protection against potential injuries caused by the tool.

In a manually fed treating and/or processing machine, the invention provides that a feeding area in front of the tool is contactlessly monitored for the existence of a hand therein, or generally speaking, for the presence of human skin therein. According to the invention, this is effected by means of a detector comprising a set of at least three semiconductor diodes At least two of these semiconductor diodes are transmitter diodes, whereas at least one of the semiconductor diodes is configured as a receiver diode. The transmitter diodes emit narrowband radiation with at least two different transmission wavelengths in the wavelength range between 400 nm and 1500 nm towards a section or partial area of the feeding area. The at least one receiver diode receives the radiation from the transmitter diodes reflected, i.e. re-emitted, from the section of the feeding area. This is suitably effected successively, i.e. the transmitter diodes are driven successively, so that the signal received from the receiver diode can be associated to the reflected radiation of each of the respective transmitter diodes.

The receiver diode supplies a signal representing the intensity of the reflected radiation.

In a signal evaluation unit, the received signals from the receiver diode or the receiver diodes are evaluated, wherein, according to the invention, a relation is established in the signal evaluation unit between the intensities of the reflected radiations from the transmitter diodes (e.g. calculating quotients or differences, or comparison), These (remission) intensities have different values, depending on whether the radiation is reflected by human skin or by the materials or objects to be processed. It is thus possible to reliably determine whether human skin, i.e. a human hand or a part of a human hand, is present in the feeding area or in the section contactlessly covered by the detector, A protective means may then be used to deactivate the tool so as to provide protection against potential injuries caused by the tool.

The contactless detector provided by the invention operates at least at a wavelength in the near-infrared range, i.e. in the range from 900 nm to 1500 nm. Studies on human skin have shown that this wavelength range is very well suited to detect hands of different complexions and under different illumination conditions and to thereby reliably distinguish it from materials such as wood, plastic material and metal. Moreover, a detector operating in the above described wavelength range is hardly exposed to electric or thermal influences, influences of humidity or variations in the illumination condition. Further, the dependence on the hue of the skin is negligible.

One of the transmitter diodes may emit in the range below 900 nm, Preferably, however, all transmitter diodes emit in the near-infrared range.

In the wavelength range selected according to the invention, the remission spectrum of human skin differs clearly from the remission spectrum of materials to be worked upon with a treating and/or processing machine, such as different kinds of wood, plastic materials and metals, so that an analysis (e.g. calculation of quotients and differences, comparison) of the remission intensities at at least two points of the wavelength range will yield an unambiguous distinction between human skin and material to be treated or processed, Thus, according to the invention, preferably narrowband (e.g. 50 nm to 200 nm at most) radiation is transmitted at at least two different transmission wavelengths, the radiation being received by a broadband receiver diode or receiver diodes after it has been reflected in the feeding area. Diverse semiconductor diodes (fight emitting diodes or laser diodes) are commercially available at low cost, which emit narrowband radiation within the wavelength range of interest. Thus, the realization of the detector can rely on already commercially available economic components, whereby the prime costs of the detector provided by the invention are reduced.

The signals from the detector can also be evaluated as fast as possible, since no camera pictures, as used in known systems, have to be evaluated Rather, merely the integrals over the intensity of the radiation reflected form a section of the feeding area are evaluated. These signals are supplied by the receiver diode, whereby these signals are immediately and quickly available and can thus also be evaluated immediately.

It is further possible to train the detector to still supply a result representing human skin, when evaluation results are obtained that only slightly deviate from the evaluation result for the detection of human skin, This is desirable, for example, if a hand to be detected is covered by a latex glove, Depending on the transmission behaviour of the glove material, skin may still be detected therethrough.

It is feasible to arrange a plurality of semiconductor diode sets, each formed by at least two transmitter diodes and at least one common receiver diode, along a row or line or several successive rows or lines in the feeding area, so that a (border) line or a (border) strip (e.g. about or in the feeding area) can be scanned. Thus, it is achieved that a hand approximating a tool can reliably be detected from a plurality of directions.

The wavelengths in the near-infrared wavelength range proposed by the invention, which are to be selected for use in the detection, are suitably detected such that the remission intensities in case of a reflection from human skin differ as clearly as possible from the remission intensities in case of materials to be treated or processed. Transmitter diodes transmitting (in a narrow band) at these preferred wavelengths exist as mentioned above and are usually available at low cost. Preferably, a detector is used which comprises transmitter semiconductor diodes and a receiver semiconductor diode, the wavelengths of the transmitter diodes preferably being at 950 nm and 1450 nm, 950 nm and 1050 nm, 950 nm and 1200 nm, 1050 nm and 1200 nm, 1050 nm and 1300 nm, 1050 nm and 1450 nm, or 1200 nm and 1450 nm.

It is a certain drawback of the use of commercial semiconductor transmitter diodes that they emit only with a relatively low intensity, In consideration of the ambient light and the ambient influences, it might happen that the radiation received by the receiver diode is too weak to obtain sufficiently reliable results. Therefore, an advantageous development of the invention provides that the transmitter diodes of two adjacent sets, transmitting at the same wavelength, overlap, i.e these two transmitting diodes illuminate a common part of the section of the feeding area, so that in turn the reflected radiation is then intensive enough to be received by the receiver diode or the receiver diodes. Alternatively or in addition, the transmitter diodes could also be pulsed to be able to emit a short-termed increase in radiation energy without being operated above their maximum allowable power loss. Optionally, it is also possible to arrange refractive or reflective optical elements, such as lenses, in front of the transmitter or receiver diodes to enhance the signal.

In an advantageous development of the invention, it is further provided that the ambient light received by the receiver diode or the receiver diodes can be compensated in the signal evaluation unit, so that the pure useful signal remaining is the light from the transmitter diodes reflected from the section of the feeding area.

It is further advantageous for the narrowband transmitter diodes to have a spectral bandwidth of up to 200 nm at most, the spectral bandwidth being defined as the range within which the transmitter diode emits with at least 50% of the maximum intensity.

Preferably, the protective means is provided with a cover element adapted to be introduced between the section of the feeding area covered by the detector and the tool, a displacement unit for removing the tool from the feeding area, a braking unit for braking the tool and/or an alarm generation unit for generating an (optical or acoustic) alarm signal.

In an alternative embodiment of the invention, a manually fed treating and/or processing machine for materials, objects or the like, is provided, comprising:

a working tool,
a feeding area in front of the tool, within which a person's hand is present when feeding material to be worked on to the tool,
a detector covering at least a section of the feeding area for a contactless detection of treatable and/or processable material, objects and the like,
the detector comprising at least one set of at least two transmitter diodes and at least one receiver diode,
the at least two transmitter diodes emitting narrowband radiation towards said section of the feeding area, said radiation being emitted at at least two different transmission wavelengths in the wavelength range between 400 nm and 1500 nm, wherein at least one of the transmitter diodes radiates in the wavelength range between 900 nm and 1500 nm, whereas the at least one receiver diode receives the radiation reflected from the section of the feeding area,
a signal evaluation unit connected with the detector for evaluating the intensity of the reflected radiation from the transmitter diodes received, in particular sequentially, by the receiver diode,
the signal evaluation unit determining from the intensities of the reflected radiation from the transmitter diodes, whether the detector detects material, objects, and the like, to be treated and/or processed and wherein
the tool can only be activated, if the detector detects material, objects, and the like, to be treated and/or processed This alternative regards a case inverse to the first alternative, wherein the tool is only activated and/or released, if the detector detects a material to be treated and/or processed To achieve the object mentioned above, the invention further provides a protective means comprising:

a detector for a contactless detection of human skin within the area covered by the detector,
the detector comprising at least one set of at least two transmitter diodes and at least one receiver diode,
the at least two transmitter diodes emitting narrowband radiation towards said area covered by the detector, said radiation being emitted at at least two different transmission wavelengths in the wavelength range between 400 nm and 1500 nm, wherein at least one of the transmitter diodes radiates in the wavelength range between 900 nm and 1500 nm, whereas the at least one receiver diode receives the radiation reflected from the section of the feeding area, and
a signal evaluation unit connected with the detector for evaluating the intensity of the reflected radiation from the transmitter diodes received, in particular sequentially, by the receiver diode,
the signal evaluation unit being adapted to determine from the intensities of the reflected radiation of the transmitter diodes, whether the detector detects human skin.

This protective means comprises a detector as described above with respect to the description of the processing machine. The protective means of the invention thus includes all above-mentioned variants of the contactless detector.

Here, it should be noted in particular that the invention is not restricted to a realization of a detector having a plurality of transmitter diodes. Generally speaking, the detector comprises a transmitter unit and a receiver unit, the transmitter unit emitting at at least two different wavelengths in the range from 400 nm to 1500 nm, at least one of said wavelengths being in the range from 900 nm to 1500 nm. Thus, depending on the position of the wavelengths, it is possible, for example, to emit these wavelengths from a single semiconductor diode, for example. It is also conceivable to form the narrowband detection radiation by filtering the radiation of a broadband radiation source. The above and the following statements on the detector should be understood such that the same is not limited to the number of transmitter diodes. Rather, a single transmitting source can be used that emits narrowband radiation at one or a plurality of wavelengths. It is further possible to invert the active principle of the invention; i.e., the radiation can be generated as broadband radiation, whereas the reflected radiation is received by at least two, in particular narrowband receivers at the wavelengths indicated with respect to the transmitter diodes.

LED's, laser diodes, luminescence emitters, or gas discharge lamps are useful as the radiation unit. The receiver unit may be formed by photodiodes, photocells, photomultipliers, CDS elements, or phototransistors.

It should further be noted here that forming a relation among the received radiation intensities at the different wavelengths refers in particular to the calculation of differences or quotients for the respective values of intensity or to a comparison between these values. The way in which the measured intensity values of the reflected radiations are related is primarily dependent on the application, For the detection of human skin as a protective measure used with a treating and/or processing machine for materials, objects and the like, it has proven suitable to form the quotient from the at least two remission intensity values, it being basically unimportant, which intensity values are used as the divisor and which are used as the dividend As already detailed above, the invention in its most general form refers to the use of radiation or transmitter units and receiver units in manually fed treating and/or processing machines or in protective means for such treating and/or processing machines. Thus, the invention proposes a manually fed treating and/or processing machine for materials, objects and the like, in particular circular saw or band saw benches, planing benches, bench drills, presses or scissors, comprising:
 a working tool,
 a feeding area in front of the tool, within which a person's hand is present when feeding material to be worked on to the tool,
 a detector covering at least a section of the feeding area for a contactless detection of human skin,
 the detector comprising at least one set of at least one radiation unit and at least one receiver unit,
 the at least one radiation unit emitting narrowband radiation towards said section of the feeding area, said radiation being emitted with at least two different wavelengths in the wavelength range between 400 nm and 1500 nm, wherein at least one of the wavelengths is in the wavelength range between 900 nm and 1500 nm, whereas the at least one receiver unit receives the radiation reflected from the section of the feeding area,
 a signal evaluation unit connected with the detector for evaluating the intensity of the reflected radiation from the radiation unit received by the receiver unit,
 the signal evaluation unit determining from the intensities of the reflected radiation from the radiation unit, whether the detector detects human skin, and wherein
 upon the detection of human skin, a protective means may be activated for protection against potential injuries caused by the tool It is essential to the invention in its general form that the intensities of the remissions are detected and analyzed selectively for at least two of the wavelengths mentioned above, since these remission intensities allow for a reliable analysis for living human skin or skin that is not vital or metabolically active, respectively Here, it is possible for the transmitter unit emits broadband radiation and the receiver unit receives in a narrow band at the at least two wavelengths, or both the transmitter unit and the receiver unit are of broadband design, however, the required selection for the at least two wavelengths or wavelength ranges being performed by wavelength-selective filtering Advantageously, one of the wavelengths of the radiation unit is below 900 nm. In particular, the wavelengths of the radiation unit are at 950 nm and 1450 nm, 950 nm and 1050 nm, 950 nm and 1200 nm, 1050 nm and 1200 nm, 1050 nm and 1300 nm, 1050 nm and 1450 nm, or 1200 nm and 1450 nm.

In an advantageous embodiment of the invention, it is further provided that a plurality of sets of radiation and receiver units are arranged side by side, the radiation units of two adjacent being arranged such that, after reflection from the area covered, the receiver unit of the respective adjacent set can detect the radiation at the same respective wavelength of the one radiation unit.

Further, it is suitable for the radiation unit and/or the receiver unit to emit radiation with a spectral bandwidth of up to 200 nm, preferably below 50 nm, The radiation unit may include a plurality of individual radiation sources emitting narrowband radiation at the wavelengths of interest These radiation sources may be LED's, laser diodes, luminescence emitters, or gas discharge lamps, in particular xenon lamps, However, it is also possible for the radiation unit to comprise only one radiation source emitting narrowband radiation, especially as a line spectrum, at different wavelengths Suitably, such a radiation source is a luminescence element emitting a line spectrum of a combination of the necessary at least two different wavelengths.

A suitable receiver unit may be a photodiode, a phototransistor, a photomultiplier, or a CDS element.

Suitably, the wavelength selection may also be realized by means of a filter unit arranged between the transmitter unit and the area covered and/or between the area covered and the receiver unit.

Suitably, at least one refractive or reflective optical element is arranged in the beam path between the radiation unit and the receiver unit.

An alternative manually fed treating and/or processing machine for materials, objects and the like, in particular circular saw or band saw benches, planing benches, bench drills, presses or scissors, comprises,
 a working tool,
 a feeding area in front of the tool, within which a person's hand is present when feeding material to be worked on to the tool,
 a detector covering at least a section of the feeding area for a contactless detection of material, objects, or the like, to be treated and/or processed,
 the detector comprising at least one set of at least one radiation unit and at least one receiver unit, the at least one radiation unit emitting narrowband radiation towards said section of the feeding area, said radiation being emitted with at least two different wavelengths in the wavelength range between 400 nm and 1500 nm, wherein at least one of the wavelengths is in the wavelength range between 900 nm and 1500 nm, whereas the at least one receiver unit receives the radiation reflected from the section of the feeding area, a signal evaluation unit connected with the detector for evaluating the intensity of the reflected radiation from the radiation unit received by the receiver unit, the signal evaluation unit determining from the intensities of the reflected radiation from the radiation unit, whether the detector detects material, objects, or the like, to be treated and/or processed, and wherein the tool can be activated only if the detector detects material, objects, or the like, to be treated and/or processed.

Finally, an alternative protective means for protecting or warning people against access to danger zones comprises:

a detector for a contactless detection of human skin within the area covered by the detector, the detector comprising at least one set of at least two transmitter diodes and at least one receiver unit, the at least one radiation unit emitting narrowband radiation towards said area covered by the detector, said radiation being emitted at at least two different wavelengths in the wavelength range between 400 nm and 1500 nm, wherein at least one of the wavelengths is in the wavelength range between 900 nm and 1500 nm, whereas the at least one receiver unit receives the radiation reflected from the section of the reception area, a signal evaluation unit connected with the detector for evaluating the intensity of the reflected radiation from the radiation unit received by the receiver unit, the signal evaluation unit being adapted to determine from the intensities of the reflected radiation of the radiation unit, whether the detector detects human skin.

Figure 2:
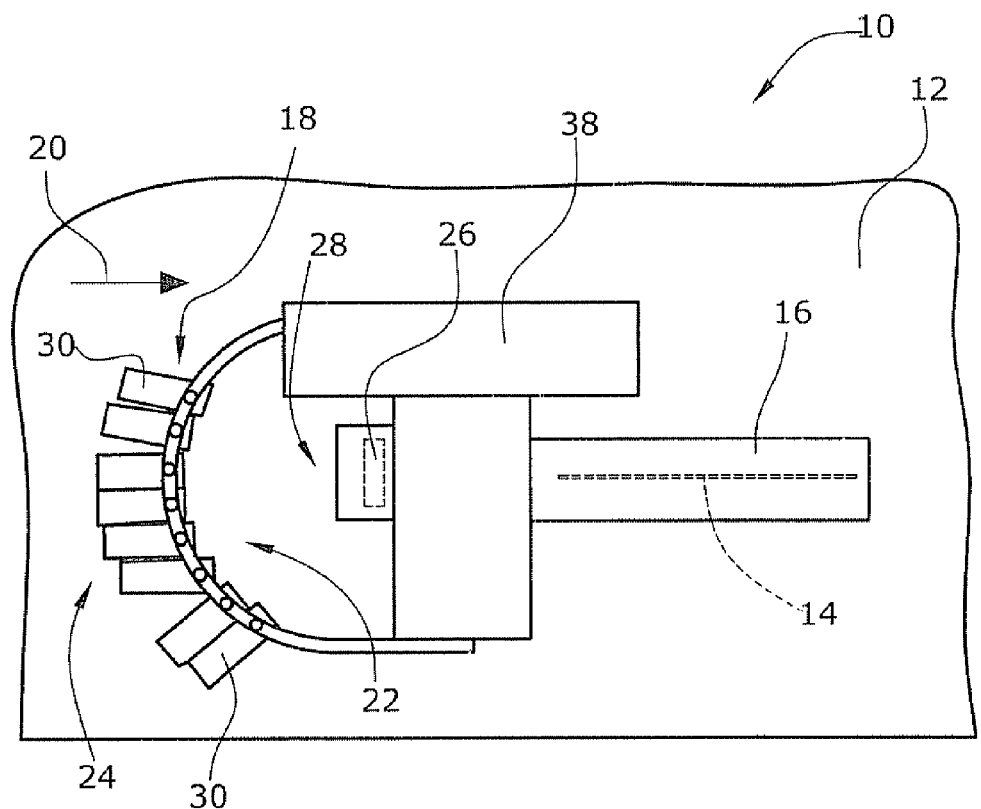

An embodiment of the invention is described hereafter in detail with reference to the drawings. In the figures:

FIG. 1 is a side view of a circular saw bench featuring the detection of human skin according to the present invention, FIG. 2 is a top plan view on the circular saw bench of FIG. 1, FIG. 3 is a schematic illustration of the emission and reception cones of the transmitter and receiver diodes of two adjacent sets of the detector, and FIG. 4 is a top plan view on the bottom face of a detector set.

FIG. 1 is a side view illustrating a circular saw bench 10 as an example of a manually fed treating and/or processing machine, wherein, according to the invention, the existence of human skin, i.e. the presence of a hand, in a predetermined area can be detected. The circular saw 10 comprises a bench 12 and a rotating saw blade 14 above which a protective hood 16 is situated, as is known per se. Material to be processed, e.g. wood, is pushed manually (see the arrow 20) through a feeding area 18 on the bench 12 of the circular saw 10, the area being located in front of the saw blade 14. Within this feeding area 18, a section 22 exists that is contactlessly and optically covered by means of a detector 24. Within this section 22, it is checked by means of the detector 24, whether human skin, ice. a human hand, is detected. If this is the case, the circular saw 10 is deactivated by lowering a cover element 26, which is a part of a protective means 28, from above the saw blade 14 down to the bench 12, thereby covering the area in front of the saw blade 14 from a detected hand. As a further measure, the saw blade 14 can be braked to a standstill.

As is obvious especially from FIG. 2, the detector 24 comprises a plurality of units 30 located about the feeding area 18 in front of the saw blade 14 and substantially laterally of the saw blade, wherein further units 30 (not illustrated in FIG. 2) may be arranged around the saw blade 14 that also cover the lateral rear area and the rear area around the saw blade. As can be seen from FIGS. 3 and 4, in this embodiment each unit 30 includes three semiconductor diodes, namely two transmitter diodes 32,34 and one receiver diode 36. The transmitter diodes are either laser or light emitting diodes. These light emitting diodes emit narrowband radiation at different wavelengths in the near-infrared range between 900 and 1500 nm. The receiver diode 36 has a broadband configuration.

All diodes of the units 30 are electrically connected to a signal evaluation unit 38 in which the signals from the receiver diode 36 are evaluated and which further drives the transmitter diodes 32,34 of the detector 24.

In this embodiment, the transmitter diode 32 transmits narrowband radiation, i.e in a range of 200 nm at most, about a wavelength of 950 nm, whereas the second transmitter diode 34 also transmits narrowband radiation at another wavelength of 1450 nm. The radiation emitted by all units 30 of the detector 24 impinges on the bench 12 in the section 22 of the feeding area 18, from where reflected radiation is received by the receiving diodes 36. Should a hand be present in this section 22, a characteristic intensity of the remission at the two transmission wavelengths is obtained. The receiver diodes 36 sense the intensity of the reflected radiation, a quotient of the intensity values being calculated in the signal evaluation unit 38. This quotient differs clearly from a remission quotient obtained by the intensity values of the remissions when the transmission radiation is reflected from material, such as wood, to be processed by the circular saw 10, Thus, a distinction between human skin or a human hand and the material to be processed can be made.

Thereby, two possibilities are obtained for the safety control of the circular saw 10. Either, the circular saw is automatically turned off when the detector detects a human hand, or the circular saw 10 is activated only when the detector 24 detects material to be processed.

Referring to FIG. 3, a particularity of the arrangement of adjacent units 30 of the detector 24 will be described shortly. The emission cones 40 of the two transmitter diodes 32 of two adjacent detector units 30, which diodes transmit at the same wavelength, overlap on the bench 12 in the area 42 (see FIG. 3), so that in this area covered by the receiver diodes 36 (see their detection cones 44) a higher radiation intensity prevails, even if each individual of the two transmitter diodes 32 only has a low radiation intensity.

The invention claimed is:

1. A working machine for manually fed workpieces, comprising:

a working tool, a feeding area in front of the tool, within which a person's hand is present when feeding workpieces to be worked on to the tool, a detector covering at least a section of the feeding area for a contactless detection of human skin, the detector comprising at least one radiation unit and at least one receiver unit, the at least one radiation unit (32,34) emitting radiation towards said section of the feeding area, said radiation being emitted with at least two different wavelengths in the wavelength range between 900 nm and 1500 nm, whereas the at least one receiver unit receives the radiation reflected from the section of the feeding area, and a signal evaluation unit connected with the detector for calculating the quotients or differences of the intensities of the reflected radiations received by the receiver unit and the at least two different wavelengths emitted from the radiation unit, wherein based on the calculating, the signal evaluation unit determines whether the detector detects human skin, and wherein upon the detection of human skin, a protective means is configured to be activated for protection against potential injuries caused by the tool, or the signal evaluation unit determines whether the detector detects workpieces to be worked on, wherein the tool can be activated only if the detector detects workpieces to be worked on.

2. The working machine of claim 1, wherein the wavelengths of the radiation unit are at the wavelengths of 950 nm and 1450 nm, 950 nm and 1050 nm, 950 nm and 1200 nm 1050 nm and 1200 nm, 1050 nm and 1300 nm, 1050 nm and 1450 nm or 1200 nm and 1450 nm.

3. The working machine of claim 1, wherein a plurality of respective sets of radiation and receiver units are arranged side by Side, the radiation units of two adjacent sets being arranged such that, after reflection from the section of the feeding area, the respective radiation at the same wavelength can be detected by the receiver unit of the respective adjacent set.

4. The working machine of claim 1, wherein ambient light received by the receiver unit can be compensated in the signal evaluation unit.

5. The working machine of claim 1, wherein the protective means comprises a cover element movable in between the section of the feeding area covered by the detector and the tool, a displacement unit for removing the tool from the feeding area, a braking unit for braking the tool and/or an alarm generation unit for generating an alarm signal.

6. The working machine of claim 5, wherein the alarm signal is an optical or acoustic alarm signal.

7. The working machine of claim 1, wherein the radiation unit emits and/or the receiver unit receives at a spectral bandwidth of up to 200 nm.

8. The working machine of claim 7, wherein the radiation unit emits and/or the receiver unit receives at the spectral bandwidth below 50 nm.

9. The working machine of clam 1, wherein the at least one radiation unit comprises at least two transmitter diodes and the at least one receiver unit comprises at least one receiver diode.

10. A protective means for protecting or warning people against access to danger zones comprising:
a detector for a contactless detection of human skin within the area covered by the detector,
the detector comprising at least one radiation unit and at least one receiver unit
the at least one radiation unit (32,34) emitting radiation towards said area covered by the detector said radiation being emitted at at least two different wavelengths in the wavelength range between 900 nm and 1500 nm, whereas the at least one receiver unit receives the radiation reflected from the area covered by the detector, and
a signal evaluation unit connected with the detector for calculating the quotients or differences of the intensities of the reflected radiations received by the receiver unit at the at least two different wavelengths from the radiation unit,
wherein based on the calculation, the signal evaluation unit is adapted to determine whether the detector detects human skin.

* * * * *